Figure 1:
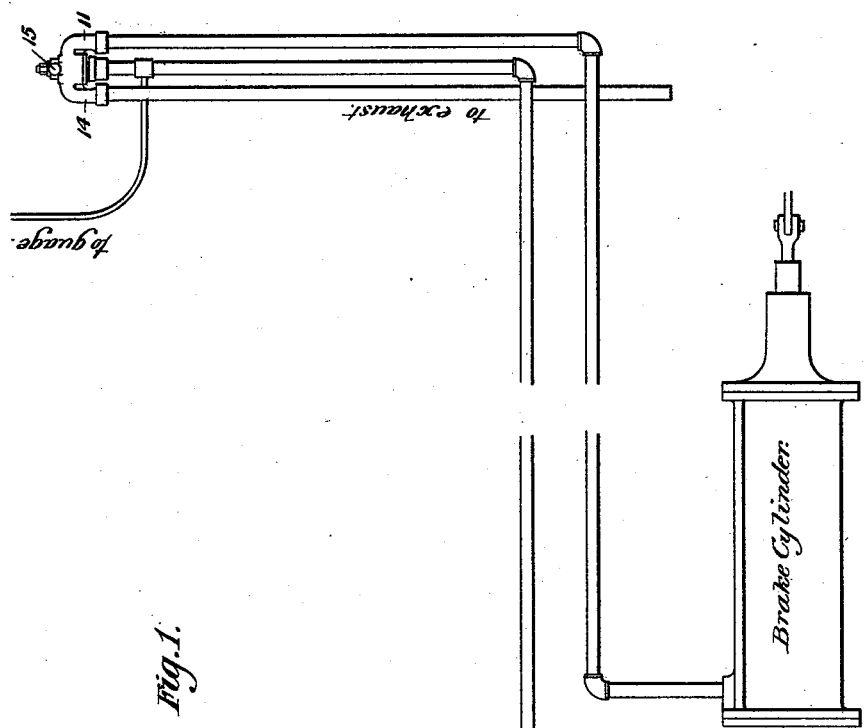

(No Model.) 2 Sheets—Sheet 1.

H. E. HUNT.
AIR BRAKE VALVE APPARATUS.

No. 543,022. Patented July 23, 1895.

WITNESSES

INVENTOR (No Model.) 2 Sheets—Sheet 2.
H. E. HUNT.
AIR BRAKE VALVE APPARATUS.
No. 543,022. Patented July 23, 1895.
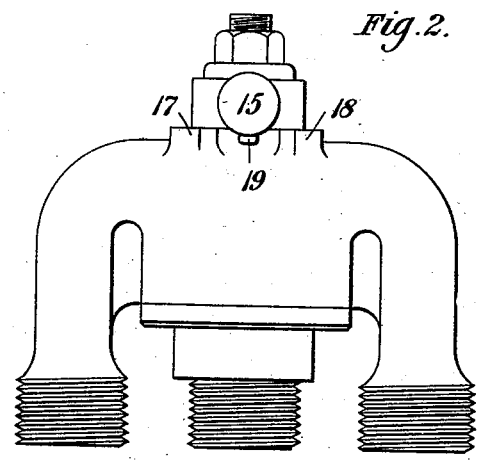
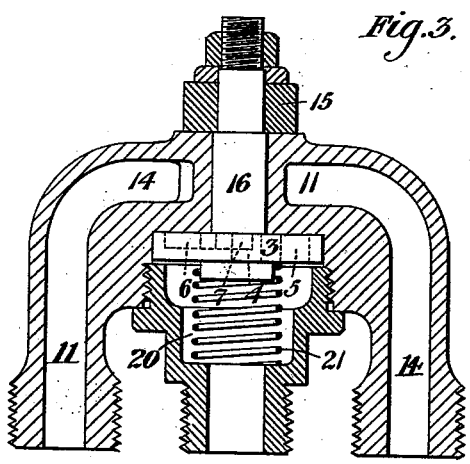
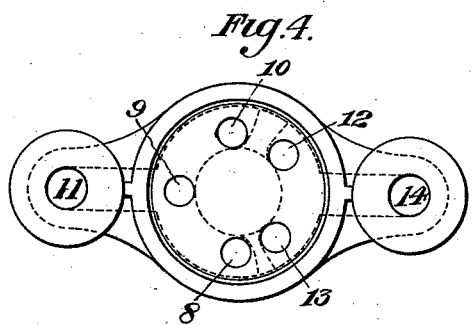
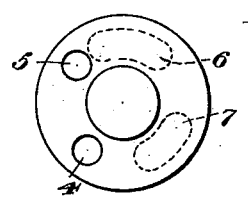
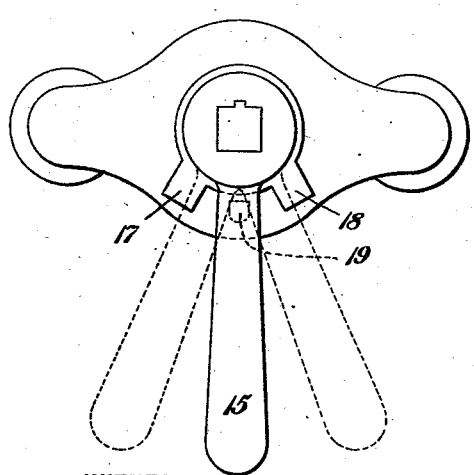
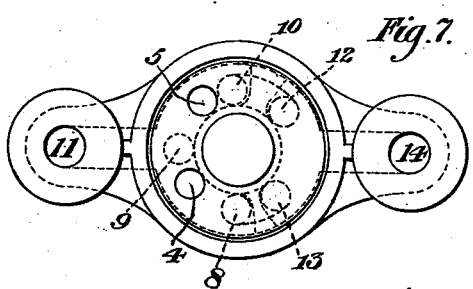
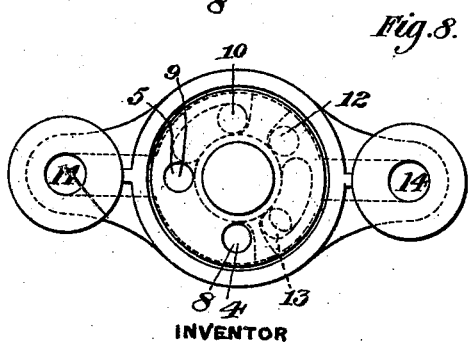
WITNESSES
N. M. Corwin
O. M. Clarke
INVENTOR
Herbert E. Hunt

UNITED STATES PATENT OFFICE.

HERBERT E. HUNT, OF PITTSBURG, PENNSYLVANIA.

AIR-BRAKE-VALVE APPARATUS.

SPECIFICATION forming part of Letters Patent No. 543,022, dated July 23, 1895.

Application filed May 1, 1894. Serial No. 509,644. (No model.)

*To all whom it may concern:*

Be it known that I, HERBERT E. HUNT, of Pittsburg, in the county of Allegheny and State of Pennsylvania, have invented a new and useful Improvement in Air-Brake-Valve Apparatus, of which the following is a full, clear, and exact description, reference being had to the accompanying drawings, forming part of this specification, in which—

Figure 1 is a diagrammatic view showing the general arrangement of the air-brake connections. Fig. 2 is a side elevation of the three-way valve, and Fig. 3 is a longitudinal vertical section of the same. Fig. 4 is a bottom plan view with the valve removed. Fig. 5 is a top plan view. Fig. 6 is a bottom plan view of the valve, and Figs. 7 and 8 are bottom plan views showing the valve in different positions.

Like symbols of reference indicate like parts in each of the figures.

My invention is designed to afford an airbrake-controlling mechanism comprising a valve which shall be quick in its action and release, and which shall be so constructed that after the compressed air has been introduced into the brake-cylinder the valve may be moved so as to confine the air therein, at the same time shutting off access from the brake-cylinder to the air-reservoir.

Fig. 1 of the accompanying drawings shows the general arrangement of the system, the three-way valve being connected to the reservoir, brake-cylinder, and exhaust, as shown, and the reservoir-pipe being provided with a branch leading to the gage for inspection by the operator. The three-way valve, as shown on Sheet 2, has a seat 2, upon which rests the valve 3, made of disk form and having extending through it two ports 4 5, and on its inner face grooved or recessed ports 6 7. The valve-seat has extending through it ports 8, 9, and 10, which open into the passage 11 in the valve casing or shell which leads to the brake-cylinder, and also ports 12 and 13, which lead to a passage 14 in the valve extending to the exhaust-port or atmosphere. The valve 3 fits neatly against the seat 2 and is adapted to be rotated by a suitable handle 15 applied to a rotary stem 16, which extends through the valve-casing within the circle in which the ports are arranged. To hold the valve in place when there is no pressure in the chamber, I provide the light spiral spring 21, pressing against its bottom face.

There are preferably provided two stop-shoulders 17 and 18 on the valve-casing adapted to engage a lug 19 on the handle at the respectively-opposite limits of the motion of the valve. The ports in the valve-seat are so related in position to each other that when the valve is at one extremity of its motion, so that the lug 19 is against the shoulder 18, the ports 8 and 9 in the valve-seat shall register with the ports 4 and 5 in the valve, as in Fig. 8, and shall thus put into direct communication the chamber 20 below the valve-seat, which leads from the air-reservoir, with the passage 11, leading to the brake-cylinder, and when in this position the full pressure of air is on the brake-cylinder and none of the ports 8, 9, and 10 are connected with the exhaust-ports 12 13. If the valve-lever be moved to the other extremity of its motion, so that the lug 19 shall engage the stop 17, the ports 4 and 5 are separated from the ports 8 and 9 respectively, and the grooved or recessed ports 7 and 6 are brought into proper position to connect respectively the port 10 with the exhaust-port 12, and the port 8 with the exhaust-port 13, as in Fig. 7, thereby cutting off connection of the brake-cylinder with the air-supply and establishing its connection with the exhaust-ports. When the valve-handle is moved into middle position, the ports 6 and 7 are disconnected from the ports 10, 12, 8, and 13, respectively, and the ports 4 and 5 are not yet brought into register with the brake-cylinder ports 8 and 9, so that in this position the brake-cylinder is cut off both from the air-supply and the exhaust-ports.

In operation the normal position of the valve is when the handle is moved so that the lug 19 shall engage the stop 17. If now the operator wishes to admit air to the brake-cylinder and to apply the brakes, he may throw the valve-handle to the other extremity of its stroke, whereupon the full pressure of air is immediately admitted to the cylinder and the car may be stopped abruptly. If, however, he desires to stop the car slowly, he should move the valve-handle but a little past the middle position, thus partially opening the connection of the cylinder-ports 8 and 9 with the air-supply, and may hold the valve in this position until sufficient air-pressure has been supplied to the cylinder. Then by moving the valve back into middle position he may confine this body of compressed air within the cylinder, so as to maintain upon the brake a constant pressure of no greater degree than the particular case may require. The facility of adjustment of the pressure upon the brake which the valve thus affords makes it of very great utility, especially when applied to such work as the braking of electric or traction street-railway cars.

When it is desired to take the pressure from the brake the operator moves the brake-handle back to its original position, thus connecting the cylinder-ports 8 and 10 with the exhaust-ports 12 and 13, and cutting off the cylinder-ports from connection with the air-reservoir. The reason for having two exhaust-ports 12 and 13 is to render the valve quick in its action, and while I deem such construction desirable, and intend to claim it specifically, it is not necessary and my broader claims are not limited thereto, for the valve is operative and desirable if the ports 5, 7, 9, 10, and 12, for example, should not be present.

The advantages of my invention will be appreciated by those skilled in the art. An especial advantage which I derive in the construction of my valve is from the fact that the valve is a disk which fits against its seat and turns thereon. The air-pressure holds the valve to its seat, making a tight joint between them without the necessity for the use of packing either on the disk or on the stem, and I thus economize in the construction of the valve and render it more durable and less liable to get out of order than other valves heretofore employed.

Within the scope of my invention, as defined in the claims, the skilled mechanic may modify in various ways the form, construction, and relative arrangement of the parts.

Those parts which I deem essential to the invention are summarized in the following claims:

1. An air-brake valve comprising a valve-casing having a seat with ports leading respectively to the exhaust and to the brake-cylinder, and a rotary disk-valve having a port or ports adapted to register with the brake-cylinder port or ports in the valve-seat and having a passage or passages adapted to connect the brake-cylinder port of the valve-seat with the exhaust-port, a valve stem projecting through the seat and an air-supply communication leading from the air reservoir into the valve casing on the side of the valve opposite to the valve-seat said valve having three positions, namely, one position connecting the cylinder port or ports with the exhaust port or ports, a middle position in which the cylinder ports are disconnected both from the exhaust port or ports and air-supply port or ports, and a third position in which the cylinder port or ports are connected with the air-supply port or ports substantially as described.

2. An air-brake valve comprising a valve-casing having a ported seat, a rotary ported disk valve seated thereon and having a stem projecting through the seat, and an air-supply pipe leading to the valve on the opposite side to the seat and stem, whereby packing of the valve and stem is avoided; substantially as described.

3. An air-brake valve comprising a valve-casing having a seat with three ports leading to the brake-cylinder and two ports leading to the exhaust, a rotary valve having two ports adapted to register with two of the brake-cylinder ports in the valve-seat, and having two passages adapted to connect two of said brake-cylinder ports with the exhaust-ports, a valve stem projecting through the seat and an air-supply communication leading from the air reservoir into the valve casing on the side of the valve opposite to its seat; substantially as described.

4. The combination with an air reservoir, a brake cylinder and a pipe connecting them, of a rotary valve interposed in said pipe, said valve having an air inlet on the side opposite to its seat and a stem projecting through the seat and having three positions, namely, one position connecting the cylinder port or ports with the exhaust port or ports, a middle position in which the cylinder ports are disconnected both from the exhaust port or ports and air-supply port or ports, and a third position in which the cylinder port or ports are connected with the air-supply port or ports.

In testimony whereof I have hereunto set my hand.

HERBERT E. HUNT.

Witnesses:
W. B. CORWIN,
H. M. CORWIN.